US008283881B2

United States Patent
Gallegos-Lopez et al.

(10) Patent No.: US 8,283,881 B2
(45) Date of Patent: Oct. 9, 2012

(54) METHODS, SYSTEMS AND APPARATUS FOR SYNCHRONOUS CURRENT REGULATION OF A FIVE-PHASE MACHINE

(75) Inventors: Gabriel Gallegos-Lopez, Torrance, CA (US); Milun Perisic, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 394 days.

(21) Appl. No.: 12/720,366

(22) Filed: Mar. 9, 2010

(65) Prior Publication Data

US 2011/0221366 A1  Sep. 15, 2011

(51) Int. Cl.
 *H02P 21/00* (2006.01)
(52) U.S. Cl. .......... 318/400.21; 318/400.02; 318/400.17
(58) Field of Classification Search ............. 318/400.01, 318/400.02, 400.03, 400.17, 400.21, 434, 318/700, 720–724
See application file for complete search history.

(56) References Cited

U.S. PATENT DOCUMENTS

| | | | |
|---|---|---|---|
| 4,896,089 A * | 1/1990 | Kliman et al. ................. | 318/701 |
| 6,459,999 B1 * | 10/2002 | Krietemeier et al. ........... | 702/65 |
| 7,782,000 B2 * | 8/2010 | Suzuki ........................... | 318/434 |
| 7,813,089 B2 * | 10/2010 | Suzuki ............................. | 361/31 |
| 7,859,206 B2 * | 12/2010 | Suzuki ....................... | 318/400.02 |

OTHER PUBLICATIONS

Toliyat, H.A., "Condition Monitoring and Fault Diagnosis of Electric Machinery," Presentation for the Advanced Electric Machines & Power Electronics Laboratory, Dept. of Electrical Engineering, Texas A&M University, US Army Vetronics Institute—2002 Winter Workshop.

* cited by examiner

*Primary Examiner* — Bentsu Ro
(74) *Attorney, Agent, or Firm* — Ingrassia Fisher & Lorenz, P.C.

(57) ABSTRACT

Methods, systems and apparatus are provided for controlling operation of and regulating current provided to a five-phase machine when one or more phases has experienced a fault or has failed. In one implementation, the disclosed embodiments can be used to synchronously regulate current in a vector controlled motor drive system that includes a five-phase AC machine, a five-phase inverter module coupled to the five-phase AC machine, and a synchronous current regulator.

18 Claims, 5 Drawing Sheets

Fig. 5

| $\delta_a$ | $\delta_b$ | $\delta_c$ | $\delta_d$ | $\delta_e$ | $\Delta\phi_a$ | $\Delta\phi_b$ | $\Delta\phi_c$ | $\Delta\phi_d$ | $\Delta\phi_e$ |
|---|---|---|---|---|---|---|---|---|---|
| 0 | 1 | 1 | 1 | 1 | N/A | $\frac{\pi}{5}$ | 0 | 0 | $-\frac{\pi}{5}$ |
| 1 | 0 | 1 | 1 | 1 | $-\frac{\pi}{5}$ | N/A | $\frac{\pi}{5}$ | 0 | 0 |
| 1 | 1 | 0 | 1 | 1 | 0 | $-\frac{\pi}{5}$ | N/A | $\frac{\pi}{5}$ | 0 |
| 1 | 1 | 1 | 0 | 1 | 0 | 0 | $-\frac{\pi}{5}$ | N/A | $\frac{\pi}{5}$ |
| 1 | 1 | 1 | 1 | 0 | $\frac{\pi}{5}$ | 0 | 0 | $-\frac{\pi}{5}$ | N/A |

Fig. 6

| $\delta_a$ | $\delta_b$ | $\delta_c$ | $\delta_d$ | $\delta_e$ | $k_a$ | $k_b$ | $k_c$ | $k_d$ | $k_e$ | $\Delta\phi_a$ | $\Delta\phi_b$ | $\Delta\phi_c$ | $\Delta\phi_d$ | $\Delta\phi_e$ |
|---|---|---|---|---|---|---|---|---|---|---|---|---|---|---|
| 0 | 0 | 1 | 1 | 1 | 0 | 0 | $\sqrt{5}$ | $\frac{5+\sqrt{5}}{2}$ | $\sqrt{5}$ | N/A | $\frac{2\pi}{5}$ | $\frac{2\pi}{5}$ | 0 | $-\frac{2\pi}{5}$ |
| 0 | 1 | 0 | 1 | 1 | 0 | $\frac{5-\sqrt{5}}{2}$ | 0 | $\sqrt{5}$ | $\sqrt{5}$ | N/A | N/A | N/A | $\frac{\pi}{5}$ | $\frac{\pi}{5}$ |
| 0 | 1 | 1 | 0 | 1 | 0 | $\sqrt{5}$ | $\frac{5+\sqrt{5}}{2}$ | $\sqrt{5}$ | 0 | N/A | 0 | 0 | $\frac{2\pi}{5}$ | N/A |
| 1 | 0 | 0 | 1 | 1 | $\sqrt{5}$ | 0 | 0 | $\sqrt{5}$ | $\frac{5+\sqrt{5}}{2}$ | $\frac{2\pi}{5}$ | N/A | N/A | $\frac{2\pi}{5}$ | 0 |
| 1 | 0 | 1 | 0 | 1 | $\frac{5-\sqrt{5}}{2}$ | 0 | $\sqrt{5}$ | 0 | 0 | 0 | N/A | $\frac{\pi}{5}$ | $-\frac{\pi}{5}$ | N/A |
| 1 | 1 | 0 | 0 | 1 | $\sqrt{5}$ | $\sqrt{5}$ | 0 | $\frac{5-\sqrt{5}}{2}$ | 0 | $\frac{\pi}{5}$ | $\frac{\pi}{5}$ | N/A | 0 | N/A |

METHODS, SYSTEMS AND APPARATUS FOR SYNCHRONOUS CURRENT REGULATION OF A FIVE-PHASE MACHINE

STATEMENT REGARDING FEDERALLY SPONSORED RESEARCH OR DEVELOPMENT

This invention was made with Government support under DE-FC26-07NT43123, awarded by the US-Department of Energy The Government has certain rights in this invention.

TECHNICAL FIELD

Embodiments of the present invention generally relate to multi-phase systems, such as those that implement five-phase machines, and more particularly relate to techniques for controlling operation of and regulating current provided to a five-phase machine when one or more phases has experienced a fault or failed.

BACKGROUND OF THE INVENTION

Electric machines are utilized in a wide variety of applications. For example, hybrid/electric vehicles (HEVs) typically include an electric traction drive system that includes an alternating current (AC) electric motor which is driven by a power converter with a direct current (DC) power source, such as a storage battery. Motor windings of the AC electric motor can be coupled to inverter sub-modules of a power inverter module (PIM). Each inverter sub-module includes a pair of switches that switch in a complementary manner to perform a rapid switching function to convert the DC power to AC power. This AC power drives the AC electric motor, which in turn drives a shaft of HEV's drivetrain. Traditional HEVs implement a three-phase pulse width modulated (PWM) inverter module, which drives a three-phase AC machine (e.g., AC motor).

Many modern high performance AC motor drives use the principle of field oriented control (FOC) or "vector" control to control operation of the AC electric motor. In particular, vector control is often used in variable frequency drives to control the torque applied to the shaft (and thus finally the speed) of an AC electric motor by controlling the current fed to the AC electric motor. In short, stator phase currents are measured and converted into a corresponding complex space vector. This current vector is then transformed to a coordinate system rotating with the rotor of the AC electric motor.

Recently, researchers have investigated the possibility of using multi-phase machines in various applications including electric vehicles. As used herein, the term "multi-phase" refers to more than three-phases, and can be used to refer to electric machines that have three or more phases. One example of a multi-phase electric machine is a five-phase AC machine. In a five-phase system, a five-phase PWM inverter module drives one or more five-phase AC machine(s). While the possibility of using five-phase systems (e.g., five-phase inverter and motor configurations) in HEVs is being explored, a lot of work remains to be done before these inverter and motor configurations can actually be implemented.

In certain circumstances, one or more of the five-phases of a five-phase system can fail or experience a fault condition. For example, in some situations, a connection between the inverter module and its corresponding motor phase can fail. This can happen, for example, due to a disconnection of a wire to/in the five-phase AC motor. For instance, the connection between the PWM inverter module and the AC motor can be "open." Such open-circuit situations can be due to a problem with a connector or cable between a pole of the five-phase PWM inverter module and a winding of the motor, damage in one of the motor stator windings, etc. Such open-circuit situations cause improper current control of the five-phase AC motor.

In other scenarios, one or more of the switches in the five-phase PWM inverter module may be operating a faulty manner, which can lead to improper current control of the five-phase AC motor, such as abnormal operation of one or more of the switches in the five-phase PWM inverter module. For example, a partial phase fault happens when a switch in one of the inverter sub-modules fails or when a gate drive circuit that generates gate drive signals malfunctions.

Nevertheless, a five-phase machine can still operate and provide torque/power when only three or four of its five phases are operational even though the system operates at a lower power rating as a three-phase or four-phase system. In such situations, it is important to maintain proper current regulation, while maintaining machine torque linearity, to limit torque and power when one or more of the five phases fails or experiences a fault condition In conventional five-phase systems, a torque-to-current mapping table is used to generate $i_a^*, i_b^*, i_c^*, i_d^*, i_e^*$ current commands. These $i_a^*, i_b^*, i_c^*, i_d^*, i_e^*$ current commands are regulated in the stationary reference frame. In particular, one stationary reference frame current regulator is used to regulate each of the $i_a^*, i_b^*, i_c^*, i_d^*, i_e^*$ current commands. Each stationary reference frame current regulator consists of a summing junction that subtracts a feedback stator current from the corresponding current command to generate a current error signal for that phase. The current error signal is applied to a proportional-integrator control module that generates a stationary reference frame voltage command signal based on the current error signal.

Regulating current commands in the stationary reference frame can be very cumbersome since five current commands are regulated independently of one another. These current commands are AC signals and there is a phase lag, which can be significant at medium/high motor speeds and therefore PI control modules are subject to errors when generating voltage command signals. To avoid this problem electric machines can be controlled with synchronous current regulator instead. System designers need to generate torque-to-current mapping or control tables that will optimize power and efficiency of the five-phase machine, and this requires an accurate characterization of machine parameters. This becomes particularly problematic when using stationary current regulators in the event one of the phases experiences a fault or failure condition. To maintain current regulation in such scenarios, separate torque-to-current mapping tables must be developed for each failure scenario. For example, a torque-to-current mapping tables that is used to when phase A fails would not be applicable in the situation where phase B fails. In addition, because a five-phase system can still operate when two phases fail, even further torque-to-current mapping tables must be generated to handle different combinations of two failed phases. Again, for each torque-to-current mapping table the system designer must characterize the behavior of the machine for that particular failure/fault scenario and develop a separate torque-to-current mapping table that will work in that scenario.

As such, improved techniques are needed for regulating current to control operation of a five-phase AC machine when one or more of the phases experiences a fault/failure condition.

Accordingly, it is desirable to provide methods, systems and apparatus for controlling operation of a five-phase AC machine when one or more phases has experienced a fault or failed. It is also desirable to provide methods, systems and apparatus for regulating current that controls a five-phase AC machine when one or more of its phases has experienced a fault or failed. Furthermore, other desirable features and characteristics of the present invention will become apparent from the subsequent detailed description and the appended claims, taken in conjunction with the accompanying drawings and the foregoing technical field and background

SUMMARY

Embodiments of the present invention relate to methods, systems and apparatus for controlling operation of and regulating current provided to a five-phase machine when one or more phases has experienced a fault or has failed.

According to one embodiment methods are provided for synchronously regulating current in a vector controlled motor drive system that includes a five-phase AC machine, a five-phase inverter module coupled to the five-phase AC machine, and a synchronous current regulator.

The five-phase inverter module generates five-phase stationary reference frame stator currents. Based on measured five-phase stationary reference frame stator currents, it can be determined whether a phase fault condition exists with respect to one or more of the five phases (e.g., one or more phase(s) is experiencing a phase fault condition), and if so, the system generates a fault signal that includes information that indicates which particular phases are presently experiencing fault condition(s).

Based on the particular phases indicated in the fault signal, a five phase-to-two phase transformation can be performed. This transformation transforms particular ones of the five-phase stationary reference frame stator currents that correspond to non-faulting phases to two-phase stationary reference frame stator currents. However, particular ones of the five-phase stationary reference frame stator currents that correspond to faulting phases that are experiencing fault condition(s) are excluded from the five phase-to-two phase transformation. This way, only the particular ones of the five-phase stationary reference frame stator currents that correspond to non-faulting phases are used to generate two-phase stationary reference frame stator currents. In some implementations, a particular combination of four stationary reference frame stator currents (e.g., that correspond to four non-faulting phases) are transformed to two-phase stationary reference frame stator currents, whereas in other implementations, a particular combination of three stationary reference frame stator currents (e.g., that correspond to three non-faulting phases) are transformed to two-phase stationary reference frame stator currents.

The synchronous current regulator generates synchronous reference frame voltage command signals based on synchronous reference frame feedback current signals and synchronous reference frame current commands. To explain further, two-phase stationary reference frame feedback stator currents along with a rotor angular position, can be used to generate synchronous reference frame feedback current signals, which can be used (along with current commands) to generate synchronous reference frame voltage command signals, which can in turn be used to generate two-phase stationary reference frame voltage command signals.

Based on the particular phases indicated in the fault signal, a two phase-to-five phase transformation can be performed that transforms the two-phase stationary reference frame voltage command signals to generate either three or four five-phase stationary reference frame voltage command signals that correspond to the particular non-faulting phases In other words, in some implementations, two-phase stationary reference frame voltage command signals are transformed into four particular five-phase stationary reference frame voltage command signals (e.g., that correspond to four particular non-faulting phases), whereas in other implementations, the two-phase stationary reference frame voltage command signals are transformed into three five-phase stationary reference frame voltage command signals (e.g., that correspond to three particular non-faulting phases).

DESCRIPTION OF THE DRAWINGS

Embodiments of the present invention will hereinafter be described in conjunction with the following drawing figures, wherein like numerals denote like elements.

FIG. 5 is a table that shows values for various combinations of phase coefficients ($\delta_i$) and phase shifting differentials ($\Delta\phi_i$) that can be used with Equation (4) during various fault/failure scenarios to transform two-phase stationary reference frame voltage command signals (V$\alpha$*, V$\beta$*) to non-faulting five-phase stationary reference frame voltage command signals (Vas*... Ves*) in accordance with some of the disclosed embodiments; and FIG. 6 is a table that that shows values for various combinations of phase coefficients ($k_i$) and phase shifting differentials ($\Delta\phi_i$) that can be used with Equation (5) during various fault/failure scenarios to transform two-phase stationary reference frame voltage command signals (V$\alpha$*, V$\beta$*) to non-faulting five-phase stationary reference frame voltage command signals (Vas*...Ves*) in accordance with some of other the disclosed embodiments.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Embodiments of the present invention relate to methods and apparatus for regulating current in a five-phase system when one or more phases has experienced a fault or failed. The disclosed methods, systems and apparatus for controlling operation of a five-phase system and regulating current provided to a five-phase machine can be implemented in operating environments such as a hybrid/electric vehicle (HEV). However, it will be appreciated by those skilled in the art that the same or similar techniques and technologies can be applied in the context of other systems in which it is desirable to control operation of a five-phase system and regulate current provided to a five-phase machine in that system when one or more phases has experienced a fault or failed. In this regard, any of the concepts disclosed here can be applied generally to "five-phase alternating current (AC) machines," and, and, as used herein, the term "AC machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs).

Figure 1:
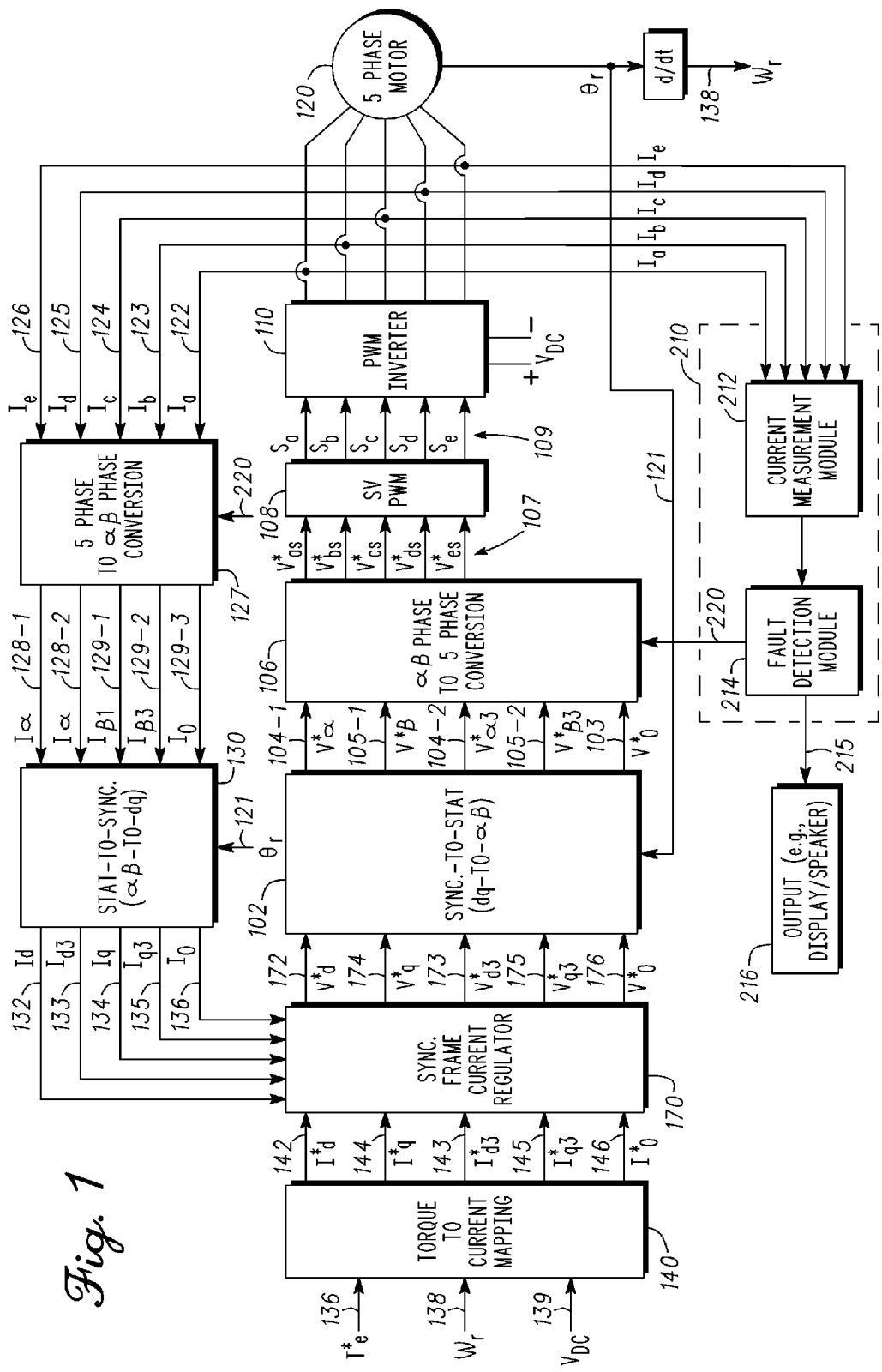
FIG. 1 is a block diagram of one example of a vector controlled motor drive system in accordance with some of the disclosed embodiments.

FIG. 1 is a block diagram of one example of a vector controlled motor drive system 100. The system 100 controls a five-phase AC machine 120 via a five-phase pulse width modulated (PWM) inverter module 110 coupled to the five-phase AC machine 120 so that the five-phase AC machine 120 can efficiently use a DC input voltage (Vdc) provided to the five-phase PWM inverter module 110 by adjusting current commands that control the five-phase AC machine 120. In one particular implementation, the vector controlled motor drive system 100 can be used to control torque in an HEV.

In the following description of one particular non-limiting implementation, the five-phase AC machine 120 is described as a five-phase AC powered motor 120, and in particular a five-phase, interior permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of multi-phase AC machine that includes five or more phases.

The five-phase AC motor 120 is coupled to the five-phase PWM inverter module 110 via five inverter poles and generates mechanical power (Torque×Speed) based on five-phase sinusoidal voltage signals received from the PWM inverter module 110. In some implementations, the angular position of a rotor (θr) of the first five-phase AC motor 120 or "shaft position" is measured using a position sensor (not illustrated), and in other implementations, the angular position of a rotor (θr) of the first five-phase AC motor 120 can be estimated without using a position sensor by using sensorless position estimation techniques.

Figure 2:
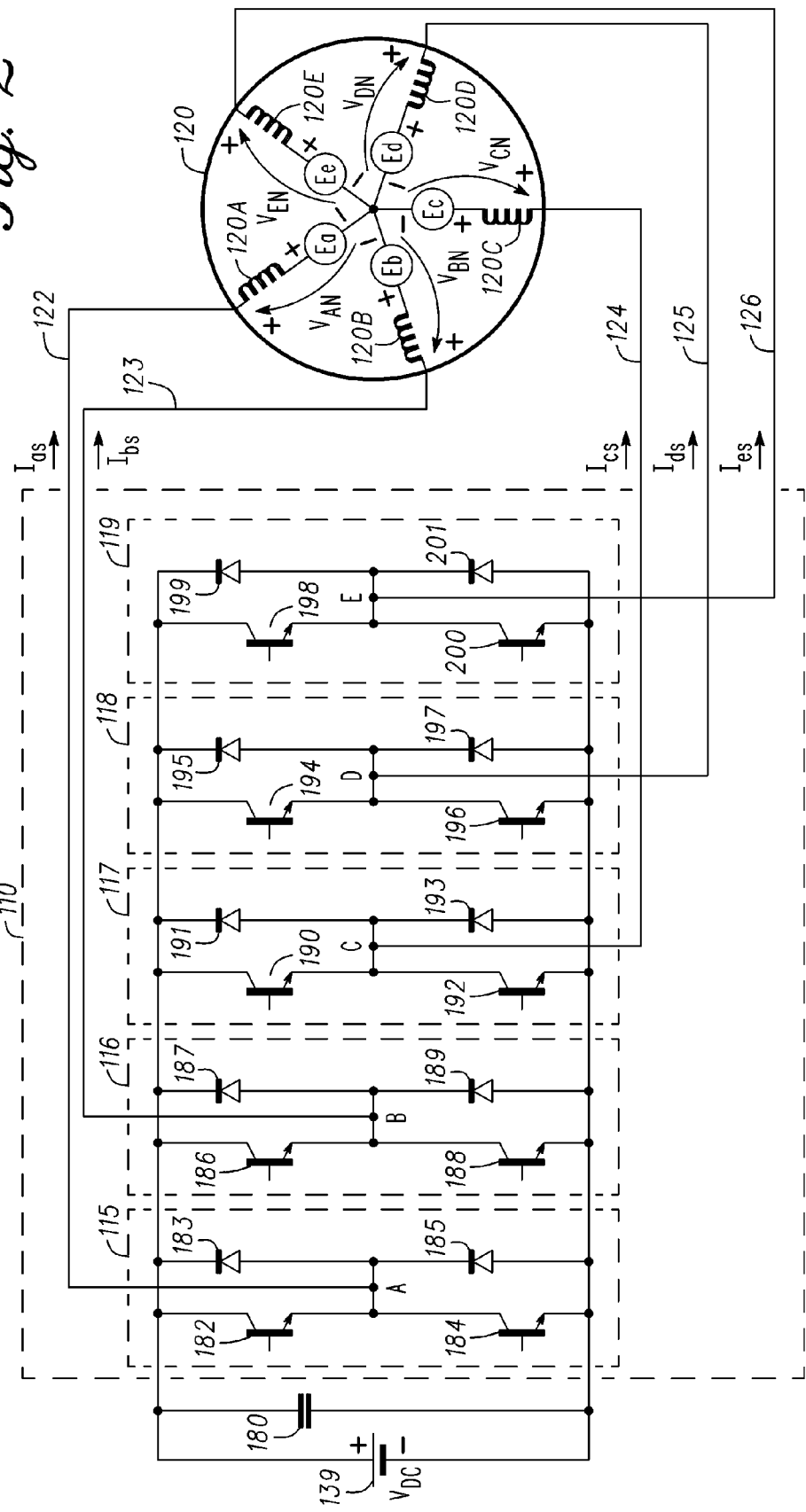
FIG. 2 is a block diagram of a portion of a motor drive system including a five-phase voltage source inverter module connected to a five-phase AC motor.

Prior to describing operation details of the system 100, a more detailed description of one exemplary implementation of the five-phase voltage source inverter 110 will be provided (including how it is connected to the five-phase AC motor 120) with reference to FIG. 2. FIG. 2 is a block diagram of a portion of a motor drive system including a five-phase voltage source inverter 110 connected to a five-phase AC motor 120. It should be noted that the five-phase voltage source inverter 110 and the five-phase motor 120 in FIG. 1 are not limited to this implementation; rather, FIG. 2 is merely one example of how the five-phase voltage source inverter 110 and the five-phase motor 120 in FIG. 1 could be implemented in one particular embodiment.

As illustrated in FIG. 2, the five-phase AC motor 120 has five stator or motor windings 120a, 120b, 120c, 120d, 120e connected to motor terminals A, B, C, D, E, and the five-phase PWM inverter module 110 includes a capacitor 180 and five inverter sub-modules 115-119. In this embodiment, in phase A the inverter sub-module 115 is coupled to motor winding 120a, in phase B the inverter sub-module 116 is coupled to motor winding 120b, in phase C the inverter sub-module 117 is coupled to motor winding 120c, in phase D the inverter sub-module 118 is coupled to motor winding 120d, and in phase E the inverter sub-module 119 is coupled to motor winding 120e. The motor windings A, B, C, D, E (120a, 120b, 120c, 120d, 120e) that are coupled together at a neutral point (N). The current into motor winding A 120a flows out motor windings B-E 120b-120e, the current into motor winding B 120b flows out motor windings A, C, D, E 120a and 120c-e, the current into motor winding C 120c flows out motor windings A, B, D, E 120a, 120b, 120d, 120e, the current into motor winding D 120d flows out motor windings A, B, C, E 120a-c and 120e and the current into motor winding E 120e flows out motor windings A-D 120a-d.

The resultant phase or stator currents (Ia-Ie) 122, 123, 124, 125, 126 flow through respective stator windings 120a-e. The phase to neutral voltages across each of the stator windings 120a-120e are respectively designated as $V_{an}$, $V_{bn}$, $V_{cn}$, $V_{dn}$, $V_{en}$, with the back electromagnetic force (BEMF) voltages generated in each of the stator windings 120a-120e respectively shown as the voltages $E_a$, $E_b$, $E_c$, $E_d$, $E_e$ produced by ideal voltage sources, each respectively shown connected in series with stator windings 120a-120e. As is well known, these back EMF voltages $E_a$, $E_b$, $E_c$, $E_d$, $E_e$ are the voltages induced in the respective stator windings 120a-120e by the rotation of the permanent magnet rotor. Although not shown, the motor 120 is coupled to a drive shaft.

The inverter 110 includes a capacitor 180, a first inverter sub-module 115 comprising a dual switch 182/183, 184/185, a second inverter sub-module 116 comprising a dual switch 186/187, 188/189, a third inverter sub-module 117 comprising a dual switch 190/191, 192/193, a fourth inverter sub-module 118 comprising a dual switch 194/195, 196/197, and a fifth inverter sub-module 119 comprising a dual switch 198/199, 200/201. As such, the inverter 110 has ten solid state controllable switching devices 182, 184, 186, 188, 190, 192, 194, 196, 198, 200 and ten diodes 183, 185, 187, 189, 191, 193, 195, 197, 199, 201 to appropriately switch compound voltage ($V_{DC}$) and provide five-phase energization of the stator windings 120a, 120b, 120c, 120d, 120e of the five-phase AC motor 120.

Although not illustrated, a closed loop motor controller can receive motor command signals and motor operating signals from the motor 120, and generate control signals for controlling the switching of solid state switching devices 182, 184, 186, 188, 190, 192, 194, 196, 198, 200 within the inverter sub-modules 115-119. Examples of these switching vectors used to construct these control signals will be described below. By providing appropriate control signals to the individual inverter sub-modules 115-119, the closed loop motor controller controls switching of solid state controllable switching devices 182, 184, 186, 188, 190, 192, 194, 196, 198, 200 within the inverter sub-modules 115-119 and thereby control the outputs of the inverter sub-modules 115-119 that are provided to motor windings 120a-120e, respectively. The resultant stator currents (Ia . . . Ie) 122-126 that are generated by the inverter sub-modules 115-119 of the five-phase inverter module 110 are provided to motor windings 120a, 120b, 120c, 120d, 120e. The voltages as $V_{an}$, $V_{bn}$, $V_{cn}$, $V_{dn}$, $V_{en}$, $E_a$, $E_b$, $E_c$, $E_d$, $E_e$ and the voltage at node N fluctuate over time depending on the open/close states of switches 182, 184, 186, 188, 190, 192, 194, 196, 198, 200 in the inverter sub-modules 115-119 of the inverter module 110, as will be described below.

Referring again to FIG. 1, the vector control motor drive system 100 includes a torque-to-current mapping module 140, a synchronous (SYNC.) frame current regulator module 170, a synchronous-to-stationary (SYNC-TO-STAT.) transformation module 102, a two-phase-to-five-phase transformation module 106, a Space Vector (SV) PWM module 108, a five-phase PWM inverter 110, a five-phase-to-two-phase transformation module 127, a stationary-to-synchronous (STAT-TO-SYNC.) transformation module 130, a current measurement and fault detection module 210 and an optional output module 216.

Figure 3A:
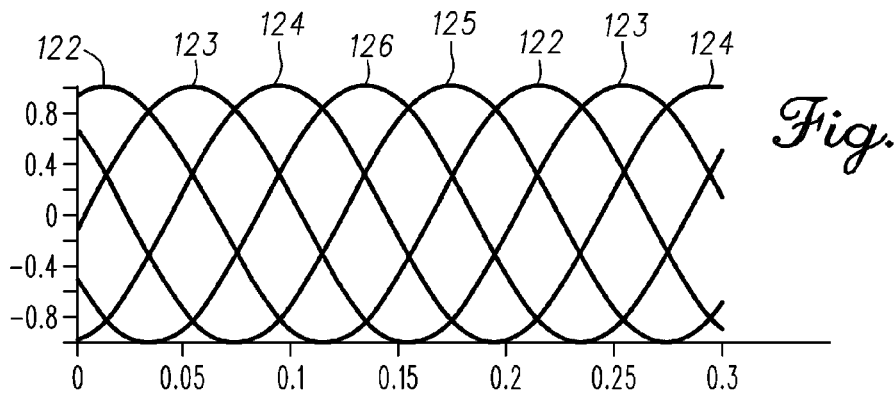
FIG. 3A is a graph showing measured five-phase stationary reference frame feedback stator currents (Ia ... Ie) when there is no fault or failure condition.

The torque-to-current mapping module 140 receives a torque command (Te*) 136, angular rotation speed (ωr) 138 of the shaft, and the DC input (or "link") voltage (Vdc) 139 as inputs. In one implementation, the angular rotation speed (ωr) 138 of the shaft can be generated based on the derivative of a rotor/shaft position output (θr) 121. Depending upon implementation the torque-to-current mapping module 140 may also receive a variety of other system parameters. The torque-to-current mapping module 140 uses the inputs to map the torque command (Te*) 136 to a fundamental d-axis current command signal (Id1*) 142, a third harmonic d-axis current command signal (Id3*) 143, a fundamental q-axis current command signal (Iq1*) 144, a third harmonic q-axis current command signal (Iq3*) 145, and a zero sequence current command signal (I0*) 146. These current command signals will cause the motor 120 to generate the commanded torque (Te*) at speed (ωr) 138. The synchronous reference frame current command signals 142-146 are DC commands that have a constant value as a function of time during steady state operation. Because the current commands are DC signals in the synchronous reference frame it is easier to regulate current commands The five-to-αβ phase transformation module 127 receives measured five-phase stationary reference frame feedback stator currents (Ia . . . Ie) 122-126 that are feedback from motor 120. FIG. 3A is a graph showing measured five-phase stationary reference frame feedback stator currents (Ia . . . Ie) 122-126 when the five-phase PWM inverter 110 and five-phase motor 120 are operating correctly and there is no fault or failure condition.

The five-to-αβ phase transformation module 127 uses these five-phase stationary reference frame feedback stator currents 122-126 and performs an abcde reference frame-to-αβ reference frame transformation to transform the five-phase stationary reference frame feedback stator currents 122-126 into αβ stationary reference frame feedback stator currents 128, 129. During normal operation, the five-to-five phase transformation can be performed using the matrices defined in equation (1) below. In equation (1) the column vector that represents the five-phase stationary reference frame feedback stator currents 122-126 is multiplied by a transformation matrix and scaling factor to generate a column vector that represents the αβ stationary reference frame feedback stator currents. With respect to this equation (1), it is noted that the αβ stationary reference frame stator currents (Iα3, Iβ3) 128-2, 129-2 can be, for example, third (or other) harmonic currents. In a system that functions normally when all five phases are operating correctly (e.g., not faulting or failing), these stationary reference frame feedback stator currents Iα3, Iβ3 and I0 can be regulated and controlled since a five-phase machine has an extra degree of freedom compared to a three-phase machine. However, when one or more phases fails/faults, the extra degree of freedom is lost, and the stationary reference frame feedback stator currents Iα3, Iβ3 and I0 can no longer be controlled/regulated. Thus, when one or more phases faults/fails for some reason, the equation (1) that is normally implemented at the five-phase to five-phase transformation module 127 for generating stationary reference frame feedback stator currents will not be accurate, as will be described in more detail below.

$$\begin{bmatrix} I_\alpha \\ I_\beta \\ I_{\alpha 3} \\ I_{\beta 3} \\ I_0 \end{bmatrix} = \frac{2}{5} \begin{bmatrix} 1 & \cos\left(\frac{2\pi}{5}\right) & \cos\left(\frac{4\pi}{5}\right) & \cos\left(\frac{4\pi}{5}\right) & \cos\left(\frac{2\pi}{5}\right) \\ 0 & \sin\left(\frac{2\pi}{5}\right) & \sin\left(\frac{4\pi}{5}\right) & -\sin\left(\frac{4\pi}{5}\right) & -\sin\left(\frac{2\pi}{5}\right) \\ 1 & \cos\left(\frac{4\pi}{5}\right) & \cos\left(\frac{2\pi}{5}\right) & \cos\left(\frac{2\pi}{5}\right) & \cos\left(\frac{4\pi}{5}\right) \\ 0 & -\sin\left(\frac{4\pi}{5}\right) & \sin\left(\frac{2\pi}{5}\right) & -\sin\left(\frac{2\pi}{5}\right) & \sin\left(\frac{4\pi}{5}\right) \\ \frac{1}{\sqrt{2}} & \frac{1}{\sqrt{2}} & \frac{1}{\sqrt{2}} & \frac{1}{\sqrt{2}} & \frac{1}{\sqrt{2}} \end{bmatrix} \times \begin{bmatrix} I_a \\ I_b \\ I_c \\ I_d \\ I_e \end{bmatrix} \quad (1)$$

Figure 3B:
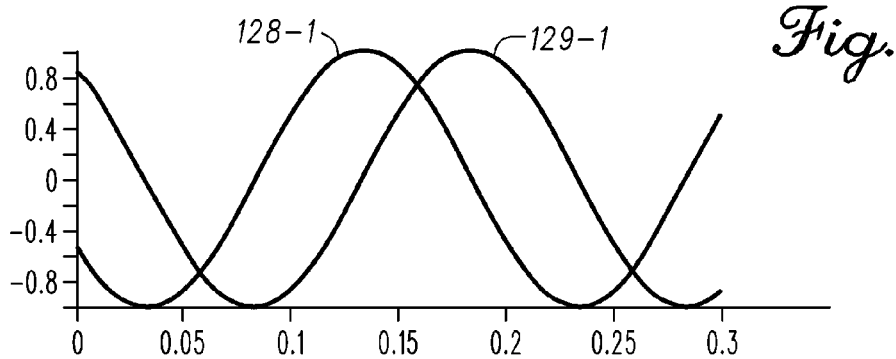
FIG. 3B is a graph showing two-phase stationary reference frame feedback stator currents (I$\alpha$, I$\beta$)

FIG. 3B is a graph showing two-phase stationary reference frame feedback stator currents (Iα, Iβ) 128-1, 129-1 computed by the five-to-αβ phase transformation module 127 based on the measured five-phase stationary reference frame feedback stator currents (Ia . . . Ie) 122-126.

The stationary-to-synchronous transformation module 130 receives the two-phase stationary reference frame feedback stator currents 128, 129 and the rotor angular position (θr) 121. The rotor position angle (θr) 121 can be measured or estimated based on information from the motor 120. The stationary-to-synchronous transformation module 130 generates (e.g., processes or converts) these two-phase stationary reference frame feedback stator currents 128, 129 to generate a fundamental synchronous reference frame d-axis current signal (Id1) 132, a third harmonic synchronous reference frame d-axis current signal (Id3) 133, a fundamental synchronous reference frame q-axis current signal (Iq1) 134, a third harmonic synchronous reference frame q-axis current signal (Iq3) 135 and a synchronous reference frame zero sequence current signal (I0) 136. The process of stationary-to-synchronous conversion is well-known in the art and for sake of brevity will not be described in detail.

The synchronous frame current regulator module 170 receives the fundamental synchronous reference frame d-axis current signal (Id1) 132, the third harmonic synchronous reference frame d-axis current signal (Id3) 133, the fundamental synchronous reference frame q-axis current signal (Iq1) 134, the third harmonic synchronous reference frame q-axis current signal (Iq3) 135, the synchronous reference frame zero sequence current signal (I0) 136, the fundamental d-axis current command signal (Id1*) 142, the third harmonic d-axis current command signal (Id3*) 143, the fundamental q-axis current command signal (Iq1*) 144, the third harmonic q-axis current command signal (Iq3*) 145, the zero sequence current command signal (I0*) 146, and uses these signals to generate a fundamental d-axis voltage command signal (Vd1*) 172, a third harmonic d-axis voltage command signal (Vd3*) 173, a fundamental q-axis voltage command signal (Vq1*) 174, a third harmonic q-axis voltage command signal (Vq3*) 175, and a zero sequence voltage command signal (V0*) 176. The voltage command signals 172-176 are also synchronous reference frame signals and are therefore DC commands that have a constant value as a function of time. The process of current to voltage conversion can be implemented as a Proportional-Integral (PI) controller, which is well-known in the art and for sake of brevity will not be described in detail.

Regulating the d-axis and q-axis current commands (Id1*, Iq1*) 142, 144 in the synchronous reference frame has a number of advantages especially in the event that one of the motor phases A, B, C, D, E experiences a fault/failure condition. For instance, because current commands are regulated in the synchronous reference frame, and not in the stationary reference frame, only two DC current commands need to be regulated. Because the current commands are DC signals in the synchronous reference frame it is easier to regulate synchronous current commands. Moreover, to handle phase fault/failure scenarios, there is no need for system designers to develop separate torque-to-current mapping tables. Instead, the same one can be used regardless of the fault/failure scenario and current regulation can still be maintained. For example, the same torque-to-current mapping table would be used when no phases fail, or when one phase fails or when two phases fail. This eliminates the need for system designers to characterize the behavior of the five-phase machine for each particular failure/fault scenario and develop a separate torque-to-current mapping table that will work in that scenario. As will be described more detail below, by regulating the d-axis and q-axis current commands (Id1*, Iq1*) 142, 144 in the synchronous reference frame, system designers only need to change equations used at the αβ-to-five phase transformation module 106 and five-to-αβ phase transformation module 127 to handle phase fault/failure conditions yet still maintain current regulation. No other blocks or modules in FIG. 1 need to be changed to handle phase fault/failure conditions.

As its inputs the synchronous-to-stationary transformation module 102 receives the synchronous reference frame voltage command signals 172-176 from the synchronous frame current regulator module 170, and the rotor position output (θr) 121. In response to these inputs, the synchronous-to-stationary transformation module 102 performs a dq-to-αβ transformation based on these signals to generate a fundamental a-axis stationary reference frame voltage command signal (Vα1*) 104-1, a fundamental β-axis stationary reference frame voltage command signal (Vβ1*) 105-1, a third harmonic a-axis stationary reference frame voltage command signal (Vα3*) 104-2, a third harmonic β-axis reference frame voltage command signal (Vβ3*) 105-2, and a zero sequence voltage command signal (V0*) 103. These voltage command signals are in the stationary reference frame and therefore have values that vary as a sine wave as a function of time. The process of synchronous-to-stationary transformation is well-known in the art and for sake of brevity will not be described in detail.

The αβ-to-five phase transformation module 106 receives the stationary reference frame voltage command signals (Vα*, Vβ*, Vα3*, Vβ3*, V0*) 103-105 generated by the synchronous-to-stationary transformation module 102, and based on these signals, generates five-phase stationary reference frame voltage command signals (Vas* ... Ves*) 107 that are sent to the Space Vector Pulse Width Modulation (SVPWM) module 200. The five-to-five phase transformation can be using the matrices defined in equation (2) below. Note that $V_0$ is assumed to be equal to zero.

$$\begin{bmatrix} V_{as^*} \\ V_{bs^*} \\ V_{cs^*} \\ V_{ds^*} \\ V_{es^*} \end{bmatrix} = \frac{5}{2} \begin{bmatrix} 1 & \cos\left(\frac{2\pi}{5}\right) & \cos\left(\frac{4\pi}{5}\right) & \cos\left(\frac{4\pi}{5}\right) & \cos\left(\frac{2\pi}{5}\right) \\ 0 & \sin\left(\frac{2\pi}{5}\right) & \sin\left(\frac{4\pi}{5}\right) & -\sin\left(\frac{4\pi}{5}\right) & -\sin\left(\frac{2\pi}{5}\right) \\ 1 & \cos\left(\frac{4\pi}{5}\right) & \cos\left(\frac{2\pi}{5}\right) & \cos\left(\frac{2\pi}{5}\right) & \cos\left(\frac{4\pi}{5}\right) \\ 0 & -\sin\left(\frac{4\pi}{5}\right) & \sin\left(\frac{2\pi}{5}\right) & -\sin\left(\frac{2\pi}{5}\right) & \sin\left(\frac{4\pi}{5}\right) \\ \frac{1}{\sqrt{2}} & \frac{1}{\sqrt{2}} & \frac{1}{\sqrt{2}} & \frac{1}{\sqrt{2}} & \frac{1}{\sqrt{2}} \end{bmatrix}^{-1} \times \begin{bmatrix} V_{\alpha^*} \\ V_{\beta^*} \\ V_{\alpha 3^*} \\ V_{\beta 3^*} \\ V_{0^*} \end{bmatrix} \quad (2)$$

In equation (2) the column vector that represents the stationary reference frame voltage command signals (Vα*, Vβ*, Vα3*, Vβ3*, V0*) 103-105 is multiplied by a transformation matrix and scaling factor to generate a column vector that represents the five-phase stationary reference frame voltage command signals (Vas* ... Ves*) 107

The SVPWM module 108 is used for the control of pulse width modulation (PWM). The five-phase PWM inverter module 110 is coupled to the SVPWM module 108. The SVPWM module 108 receives the five-phase stationary reference frame voltage command signals (Vas* ... Ves*) 107 as inputs, and uses these signals to generate switching vector signals (Sa ... Se) 109, which it provides to the five-phase PWM inverter module 110. The particular SV modulation algorithm implemented in the SV PWM module 108 can be any known SV modulation algorithm. The switching vector signals (Sa ... Se) 109 control the switching states of switches in PWM inverter 110 to generate five-phase voltage commands. The five-phase PWM inverter module 110 receives the DC input voltage (Vdc) and switching vector signals (Sa ... Se) 109, and uses them to generate five-phase alternating current (AC) voltage signal waveforms at inverter poles that drive the five-phase AC machine/motor 120 at varying speeds.

The five-phase interior permanent magnet synchronous motor 120 receives the five-phase voltage signals generated by the PWM inverter 110 and generates a motor output at the commanded torque Te* 136. In this one particular implementation, the motor 120 comprises a five-phase interior permanent-magnet synchronous motor (IPMSM) 120. The measured feedback stator currents (Ia-Ie) are sensed, sampled and provided to the five-to-two phase transformation module 127 as described above.

Although not illustrated in FIG. 1, the system 100 may also include a gear coupled to and driven by a shaft of the five-phase AC machine 120.

Figure 3C:
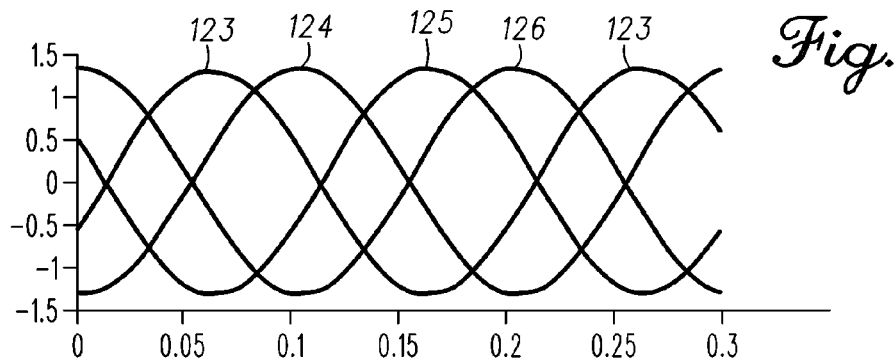
FIG. 3C is a graph showing measured five-phase feedback stator currents (Ia ... Ie) when there is a fault or failure condition in phase A.

Synchronous Current Regulation of a Five-Phase Machine with at Least One Faulted/Failed Phase FIG. 3C is a graph showing measured five-phase feedback stator currents (Ia ... Ie) 122-126 when the five-phase PWM inverter 110 or five-phase motor 120 are not operating correctly and there is a fault or failure condition in phase A (e.g., current Ia 122 is not present).

In the event of a phase-fault or failure (i.e. when one or more phases fail), the standard equation (1) that is normally used to make the five-to -αβ phase transformation does not apply and produces inaccurate results. Likewise, the standard equation (2) that is normally used to make the αβ-to-five phase transformation does not apply and produces inaccurate results. According to an embodiment, these equations are not used to regulate current in the synchronous frame.

In accordance with the disclosed embodiments, methods, systems and apparatus are provided for synchronous current regulation of a five-phase machine when one or more phase(s) are experiencing a fault/failure condition. As will be described below with reference to FIGS. 1 and 6, when the current measurement and fault detection module 210 detects a phase fault (or phase failure), the disclosed embodiments are designed to mitigate performance issues that may otherwise occur at the αβ-to-five phase transformation module 106, and the five-to-αβ phase transformation module 127 that are described above.

Figure 4:
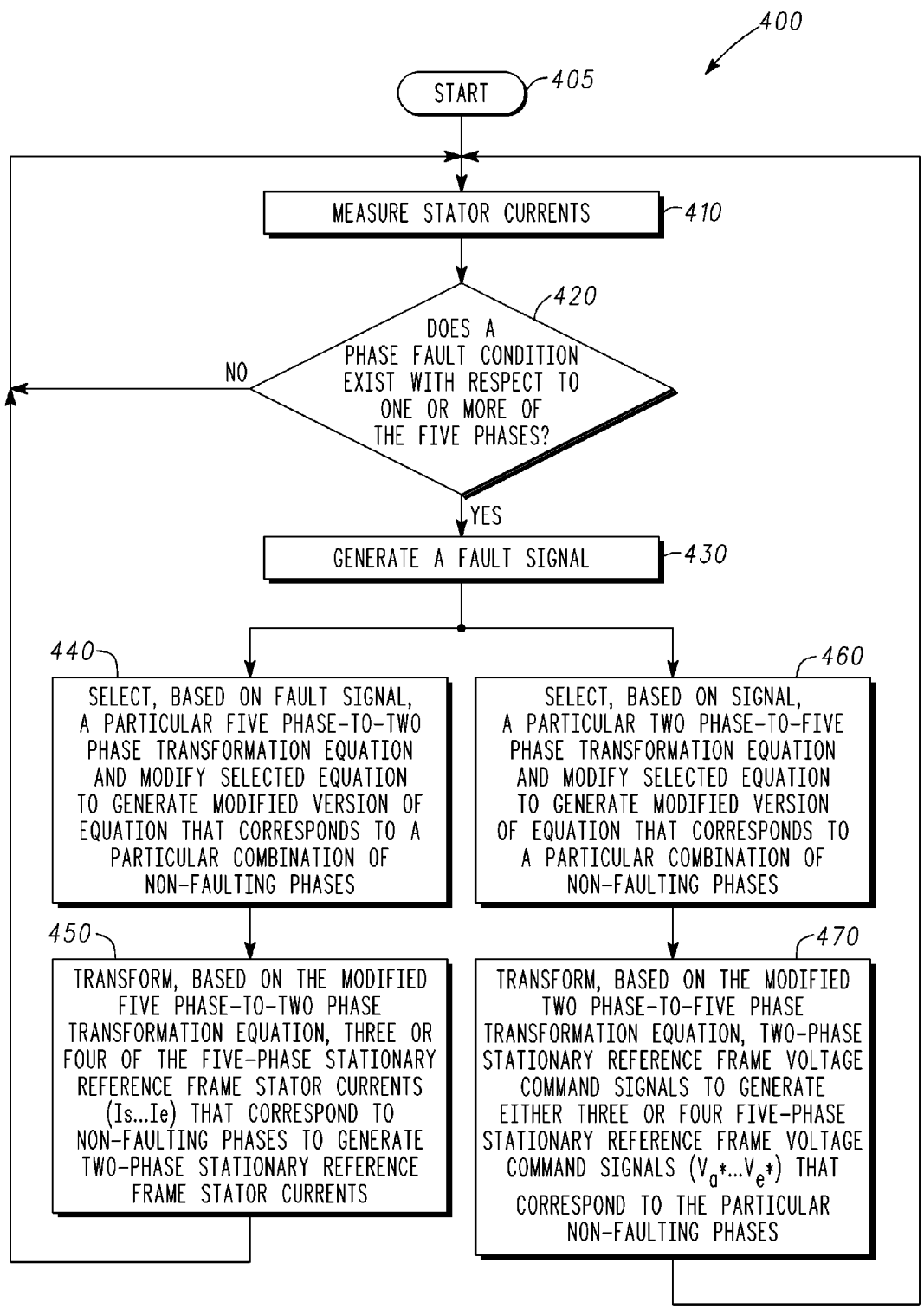
FIG. 4 is a flowchart illustrating a method in accordance with some of the disclosed embodiments.

FIG. 4 is a flowchart illustrating a method 400 in accordance with some of the disclosed embodiments, and will be described below with reference to FIG. 1. Method 400 begins at step 405, when the current measurement and fault detection module and an output module 210 receives currents (Ia . . . Ie) that are fedback from the five-phase AC motor 120.

In this particular embodiment, the current measurement and fault detection module 210 comprises a current measurement module 212 that measures amplitude of the five-phase stationary reference frame stator currents (Ia . . . Ie) 122-126 generated by the inverter sub-modules 115-119 (step 410). In other embodiments, current measurement module 212 can measure other characteristics of the five-phase stationary reference frame stator currents (Ia . . . Ie) 122-126 that can be used to determine whether there is a fault. Examples would include, for instance, RMS measurement, FFT, signal faults from gate drive, and the like. The current measurement and fault detection module 210 also includes a fault detection module 214 that receives current measurements from the current measurement module 212 and processes them to determine whether a fault condition or failure condition exists with respect to one or more of the phases (step 420).

In this regard, the fault detection module 214 can be used to detect abnormal operation of a five-phase PWM inverter module due to, for example: (1) a malfunction of the power electronics system (e.g., when one or more switching devices of the five-phase PWM inverter module is turned off due to problem in power electronics circuit), (2) a physical disconnection involving the five-phase PWM inverter module (e.g., when there is a physical disconnection between a wire/line/cable that connects a pole of the five-phase PWM inverter module to a motor winding of the motor), (3) a problem with an inverter connector, (4) damage to motor stator winding, or (5) a problem with a connection to a grid of a converter application, etc. For example, in one implementation, the fault detection module 214 can detect an actual physical open circuit condition involving a five-phase PWM inverter module 110. In some implementations, the fault detection module 214 can also detect a "malfunction of" or "abnormal operation of" the five-phase PWM inverter module 110 (e.g., when one or more of the switches in the five-phase PWM inverter module 110 are off or not operating properly). In general, "operating properly" as used here can mean that an inverter sub-module is working properly (e.g., that the switches that generate the five-phase stationary reference frame stator current (Ia) 122 are generating a current and operating normally, and that with respect to phase A there is cable connection between the inverter sub-module 115 and the phase A motor winding).

When the fault detection module 214 detects a phase fault or phase failure based on the measured five-phase stationary reference frame currents (Ia . . . Ie) 122-126, the fault detection module 214 generates a fault signal 220 (step 430) and sends it to the five-to-αβ phase transformation module 127 to indicate that a fault/failure condition has been detected with respect to one (or more) phase(s). The fault signal 220 includes information that indicates which particular phases are presently experiencing a fault condition or have failed. In some implementations, when the current measurement and fault detection module 210 detects a phase fault or phase failure it also provides a fault indicator signal 215 to the output module 216, which can include for example a display, indicator light and/or speaker used to indicate the detected fault to an observer (e.g., an operator of the vehicle).

The five-to-αβ phase transformation module 127 in accordance with the disclosed embodiments is designed to identify, select and modify equations (1) and (2) (above) that are necessary for current regulation in the synchronous frame when one (or more) phase(s) fails in five-phase machine. In response to the fault signal 220, the five-to-αβ phase transformation module 127 selects (step 440), based on the particular phases that are identified as being faulty or in failure, the appropriate modified variation of equation (3) (below) for transforming non-faulting ones of the five-phase stationary reference frame currents (Ia . . . Ie) 122-126 to two-phase stationary reference frame feedback stator currents 128-1, 129-1, by zeroing out columns that correspond to the faulting/failing phase by setting a phase coefficient ($\delta_i$) for that faulting/failing phase equal to zero (0). The five-to-αβ phase transformation module 127 then uses the appropriate equation to transform non-faulting ones of the five-phase stationary reference frame currents (Ia . . . Ie) 122-126 to αβ-phase stationary reference frame feedback stator currents 128-1, 129-1 (step 450).

$$\begin{bmatrix} I_\alpha \\ I_\beta \end{bmatrix} = \frac{2}{5} \begin{bmatrix} \delta_a\cos(0) & \delta_b\cos\left(\frac{-2\pi}{5}\right) & \delta_c\cos\left(\frac{-4\pi}{5}\right) & \delta_d\cos\left(\frac{4\pi}{5}\right) & \delta_e\cos\left(\frac{2\pi}{5}\right) \\ \delta_a\sin(0) & \delta_b\sin\left(\frac{-2\pi}{5}\right) & \delta_c\sin\left(\frac{-4\pi}{5}\right) & \delta_d\sin\left(\frac{4\pi}{5}\right) & \delta_e\sin\left(\frac{2\pi}{5}\right) \end{bmatrix} \times \begin{bmatrix} I_a \\ I_b \\ I_c \\ I_d \\ I_e \end{bmatrix} \quad (3)$$

$$\delta_i = \begin{cases} 0, & \text{faulted phase} \\ 1, & \text{healthy phase} \end{cases}, \text{where } i \text{ is } a, b, c, d, \text{ or } e$$

Thus, the five-to-αβ phase transformation module 127 in accordance with the disclosed embodiments uses the fault signal 220 to modify equation (3) as necessary for current regulation in the synchronous frame such that the "healthy" or non-faulting stationary frame currents can be transformed to alpha and beta stationary frame currents.

For instance, when the fault detection module 214 detects a phase fault or phase failure based on the measured five-phase stationary reference frame current signal (Ia) 122, the fault detection module 214 generates a fault signal 220 and sends it to the five-to-αβ phase transformation module 127 to indicate that a fault/failure condition has been detected with respect to five-phase stationary reference frame current signal (Ia) 122 of phase A. The fault signal 220 includes information that indicates that phase A is presently experiencing a fault condition or failure. In response to the fault signal 220, the five-to-αβ phase transformation module 127 modifies equation (3) as shown below in equation 3A, and computes values for αβ-phase stationary reference frame feedback stator currents (Iα, Iβ) 128-1, 129-1 that may better provide current regulation in the synchronous frame when phase A has faulted/failed.

$$\begin{bmatrix} I_\alpha \\ I_\beta \end{bmatrix} = \frac{2}{5} \begin{bmatrix} 0 & \cos\left(\frac{-2\pi}{5}\right) & \cos\left(\frac{-4\pi}{5}\right) & \cos\left(\frac{4\pi}{5}\right) & \cos\left(\frac{2\pi}{5}\right) \\ 0 & \sin\left(\frac{-2\pi}{5}\right) & \sin\left(\frac{-4\pi}{5}\right) & \sin\left(\frac{4\pi}{5}\right) & \sin\left(\frac{2\pi}{5}\right) \end{bmatrix} \times \begin{bmatrix} I_a \\ I_b \\ I_c \\ I_d \\ I_e \end{bmatrix} \quad (3A)$$

In equation (3A), the first column of the second transformation matrix has zero values such that the five-phase stationary reference frame current signal (Ia) 122 corresponding to phase A is not considered when converting non-faulting ones of the five-phase stationary reference frame current signals (Ib ... Ie) 123-126 to two-phase stationary reference frame stator current signals (Iα, Iβ) 128-1, 129-1. Thus, the five-to-αβ phase transformation module 127 can modify equation (3) to generate the appropriate equation for computation of two-phase stationary reference frame stator current signals (Iα, Iβ) 128-1, 129-1 such that only the "healthy" or non-faulting stationary reference frame five-phase current signals (Ib ... Ie) 123-126 are transformed to two-phase stationary reference frame stator current signals (Iα, Iβ) 128-1, 129-1. This helps ensure more accurate current regulation in the synchronous frame.

Consider another example when the fault detection module 214 detects a phase fault or phase failure based on the measured five-phase stationary reference frame current signal (Ia) 122 and the measured five-phase stationary reference frame current signal (Ib) 123. Here, the fault detection module 214 generates a fault signal 220 and sends it to the five-to-two phase transformation module 127 to indicate that a fault/failure condition has been detected with respect to five-phase stationary reference frame current signal (Ia) 122 corresponding to phase A and the five-phase stationary reference frame current signal (Ib) 123 corresponding to phase B. The fault signal 220 includes information that indicates that phases A and B are presently experiencing a fault condition or failure. In response to the fault signal 220, the five-to-two phase transformation module 127 modifies equation (3) as per equation (3B) below to provide improved current regulation in the synchronous frame when both phases A and B have faulted/failed.

$$\begin{bmatrix} I_\alpha \\ I_\beta \end{bmatrix} = \frac{2}{5} \begin{bmatrix} 0 & 0 & \cos\left(\frac{-4\pi}{5}\right) & \cos\left(\frac{4\pi}{5}\right) & \cos\left(\frac{2\pi}{5}\right) \\ 0 & 0 & \sin\left(\frac{-4\pi}{5}\right) & \sin\left(\frac{4\pi}{5}\right) & \sin\left(\frac{2\pi}{5}\right) \end{bmatrix} \times \begin{bmatrix} I_a \\ I_b \\ I_c \\ I_d \\ I_e \end{bmatrix} \quad (3B)$$

In equation (3B), the first and second columns of the second transformation matrix have zero values such that the five-phase stationary reference frame current signal (Ia) 122 corresponding to phase A and the five-phase stationary reference frame current signal (Ib) 123 corresponding to phase B are not considered when converting non-faulting ones of the five-phase stationary reference frame current signals (Ic ... Ie) 124-126 to αβ-phase stationary reference frame current signals (Iα, Iβ) 128-1, 129-1. Thus, the five-to-two phase transformation module 127 can modify equation (3) as appropriate for computation of stationary frame feedback stator currents (Iα, Iβ) 128-1, 129-1 such that only the "healthy" or non-faulting stationary frame five-phase stationary reference frame current signals (Ic ... Ie) 124-126 are transformed to alpha (α) and beta (β) stationary reference frame current signals (Iα, Iβ) 128-1, 129-1.

It will be appreciated that equation (3) can be modified as appropriate to generate similar equations (not shown) at the five-to-αβ phase transformation module 127 that can be used to compute stationary reference frame feedback stator current signals (Iα, Iβ) 128-1, 129-1 when any one of the other phases B, C, D, E are experiencing a fault condition. In such cases, the columns of the second transformation matrix that correspond to non-faulting phases would have the values indicated in the corresponding columns of the transformation matrix in equation (1), and the columns of the second transformation matrix that correspond to the faulting phase will have zero values such that the five-phase stationary reference frame current signals (Ib ... Ie) 123-126 corresponding to the particular faulting phase is not considered when converting non-faulting ones of the five-phase currents to stationary reference frame feedback stator currents (Iα, Iβ) 128-1, 129-1.

Similarly, it will be appreciated that similar equations (not shown) can be used at the five-to-two phase transformation module 127 to compute stationary frame feedback stator currents (Iα, Iβ) 128-1, 129-1 when any combination of two-phases are experiencing a fault condition. Two columns of the transformation matrix that correspond to the faulting phases will include zero values such that the five-phase currents corresponding to the particular faulting phases are not considered and the other columns will use the values indicated in equation (3) above when converting non-faulting ones of the five-phase currents to stationary frame feedback stator currents (Iα, Iβ) 128-1, 129-1.

Similar considerations apply with respect to the transformations by the αβ-to-five phase transformation module 106. As mentioned above, the αβ-to-five phase transformation module 106 receives the αβ-phase stationary reference frame voltage command signals (Vα*, Vβ*) 104-1, 105-1, and based on these signals, generates a five-phase stationary reference frame voltage command signals (Vas* ... Ves*) 107. The standard equation (2) that is used to perform the αβ-to-five phase transformation should not be used when one or more of the phases is experiencing a fault/failure condition.

Thus, when the fault detection module 214 detects (at step 420) a phase fault or phase failure based on the measured five-phase stationary reference frame currents (Ia ... Ie) 122-126, the fault detection module 214 generates a fault signal 220 (step 430) and sends it to αβ-to-five phase transformation module 106 to indicate that a fault/failure condition has been detected with respect to one (or more) phase(s). The fault signal 220 includes information that indicates which particular phases are presently experiencing a fault condition or have failed.

The αβ-to-five phase transformation module 106 in accordance with the disclosed embodiments is designed to identify/select and modify an appropriate equation that is necessary for current regulation in the synchronous frame when one (or more) phase(s) fails. In response to the fault signal 220, the αβ-to-five phase transformation module 106 identifies/selects (step 460) equation (4) or (5) below, based on the particular phases that are identified as being faulty or in failure, and modifies the selected equation to generate an appropriate equation for transforming the αβ-phase stationary reference frame voltage command signals (Vα*, Vβ*) 104-1, 105-1 to non-faulting five-phase stationary reference frame voltage command signals (Vas* . . . Ves*) 107.

For example, when the fault signal indicates that one phase has faulted/failed, the αβ-to-five phase transformation module 106 identifies/selects (step 460) equation (4) below, and modifies the selected equation (4), based on the particular phases that are identified as being faulty or in failure, to generate an appropriate modified version of equation (4) for transforming the αβ-phase stationary reference frame voltage command signals (Vα*, Vβ*) 104-1, 105-1 to non-faulting five-phase stationary reference frame voltage command signals (Vas* . . . Ves*) 107. In particular, the αβ-to-five phase transformation module 106 modifies equation (4) by setting phase coefficient ($\delta_i$) for the faulted/failed phase equal to zero (0) to zero out the row that corresponds to the faulting/failing phase. Table 1 of FIG. 5 shows various combinations of the phase coefficients ($\delta_i$) and the phase shifting differential ($\Delta\phi_i$) for various fault scenarios in which equation (4) can apply.

$$\begin{bmatrix} V_{as*} \\ V_{bs*} \\ V_{cs*} \\ V_{ds*} \\ V_{es*} \end{bmatrix} = \frac{5-\sqrt{5}}{2} \begin{bmatrix} \delta_a\cos(\Delta\varphi_a) & \delta_a\sin(\Delta\varphi_a) \\ \delta_b\cos\left(\Delta\varphi_b - \frac{2\pi}{5}\right) & \delta_b\sin\left(\Delta\varphi_b - \frac{2\pi}{5}\right) \\ \delta_c\cos\left(\Delta\varphi_c - \frac{4\pi}{5}\right) & \delta_c\sin\left(\Delta\varphi_c - \frac{4\pi}{5}\right) \\ \delta_d\cos\left(\Delta\varphi_d + \frac{4\pi}{5}\right) & \delta_d\sin\left(\Delta\varphi_d + \frac{4\pi}{5}\right) \\ \delta_e\cos\left(\Delta\varphi_e + \frac{2\pi}{5}\right) & \delta_e\sin\left(\Delta\varphi_e + \frac{2\pi}{5}\right) \end{bmatrix} \times \begin{bmatrix} V_{\alpha*} \\ V_{\beta*} \end{bmatrix}, \quad (4)$$

where Table 1 of FIG. 5 indicates which phase has faulted via setting phase coefficient ($\delta_i$) for that phase equal to zero (0).

For instance, when the fault detection module 214 detects a phase fault or phase failure based on the measured five-phase stationary reference frame current signal (Ia) 122, the fault detection module 214 generates a fault signal 220 and sends it to the αβ-to-five phase transformation module 106 to indicate that a fault/failure condition has been detected with respect to five-phase stationary reference frame current signal (Ia) 122 that corresponds to phase A. The fault signal 220 includes information that indicates that phase A is presently experiencing a fault condition or failure. In response to the fault signal 220, the αβ-to-five phase transformation module 106 identifies/selects equation (4) and modifies it as indicated in equation (4A) below to provide improved current regulation in the synchronous frame when phase A has faulted/failed.

$$\begin{bmatrix} V_{as*} \\ V_{bs*} \\ V_{cs*} \\ V_{ds*} \\ V_{es*} \end{bmatrix} = \frac{5-\sqrt{5}}{2} \begin{bmatrix} 0 & 0 \\ \cos\left(\frac{-\pi}{5}\right) & \sin\left(\frac{-\pi}{5}\right) \\ \cos\left(\frac{-4\pi}{5}\right) & \sin\left(\frac{-4\pi}{5}\right) \\ \cos\left(\frac{4\pi}{5}\right) & \sin\left(\frac{4\pi}{5}\right) \\ \cos\left(\frac{\pi}{5}\right) & \sin\left(\frac{\pi}{5}\right) \end{bmatrix} \times \begin{bmatrix} V_{\alpha*} \\ V_{\beta*} \end{bmatrix} \quad (4A)$$

In equation (4A) the first row of the transformation matrix has zero values such that phase A is not considered when converting the two-phase stationary reference frame voltage command signals (Vα*, Vβ*) 104-1, 105-1 to non-faulting five-phase stationary reference frame voltage command signals (Vas* . . . Ves*) 107.

Thus, the αβ-to-five phase transformation module 106 can apply the appropriate equation for computation of the five-phase stationary reference frame voltage command signals (Vas* . . . Ves*) 107 such that only the "healthy" or non-faulting phases are taken into account during the transformation. This helps ensure more accurate current regulation in the synchronous frame. Although equation (4A) above assumes that phase A is in a fault condition, it will be appreciated that similar equations (not shown) can be used at the αβ-to-five phase transformation module 106 to compute non-faulting five-phase stationary reference frame voltage command signals (Vas* . . . Ves*) 107 when one of the other phases B, C, D, E are experiencing a fault condition. In such cases, the columns of the transformation matrix in equation (4) that correspond to the non-faulting phases would have the same values as indicated in equation (4), and any columns of the transformation matrix that correspond to faulting phase(s) would be replaced with zero values such that the particular faulting phase(s) is/are not considered when converting the two-phase stationary reference frame voltage command signals (Vα*, Vβ*) 104-1, 105-1 to non-faulting five-phase stationary reference frame voltage command signals (Vas* . . . Ves*) 107.

The αβ-to-five phase transformation module 106 then transforms, based on the modified equation, the αβ-phase stationary reference frame voltage command signals (Vα*, Vβ*) 104-1, 105-1 to non-faulting five-phase stationary reference frame voltage command signals (Vas* . . . Ves*) 107 (step 460). Thus, in accordance with the disclosed embodiments, the αβ-to-five phase transformation module 106 uses the fault signal 220 to select the appropriate equation that may better provide current regulation in the synchronous frame.

The general equation (2) can also be modified when two phases are experiencing a fault/failure condition. For instance, when the fault signal indicates that phase D, for example, is healthy and that two of the other phases have faulted/failed, the αβ-to-five phase transformation module 106 identifies/selects (step 460) equation (5) below, and modifies the selected equation (5), based on the particular phases that are identified as being faulty or in failure and corresponding entries in Table 2 of FIG. 6, to generate an appropriate modified version of equation (5) for transforming the αβ-phase stationary reference frame voltage command signals (Vβ*, Vβ*) 104-1, 105-1 to non-faulting five-phase stationary reference frame voltage command signals 107. Table 2 of FIG. 6 shows various combinations of the phase scaling coefficients ($k_i$) and the phase shifting differential ($\Delta\phi_i$) for various fault scenarios in which equation (5) can apply.

$$\begin{bmatrix} V_{as^*} \\ V_{bs^*} \\ V_{cs^*} \\ V_{ds^*} \\ V_{es^*} \end{bmatrix} = \begin{bmatrix} k_a\cos(\Delta\varphi_a) & k_a\sin(\Delta\varphi_a) \\ k_b\cos\left(\Delta\varphi_b - \frac{2\pi}{5}\right) & k_b\sin\left(\Delta\varphi_b - \frac{2\pi}{5}\right) \\ k_c\cos\left(\Delta\varphi_c - \frac{4\pi}{5}\right) & k_c\sin\left(\Delta\varphi_c - \frac{4\pi}{5}\right) \\ k_d\cos\left(\Delta\varphi_d + \frac{4\pi}{5}\right) & k_d\sin\left(\Delta\varphi_d + \frac{4\pi}{5}\right) \\ k_e\cos\left(\Delta\varphi_e + \frac{2\pi}{5}\right) & k_e\sin\left(\Delta\varphi_e + \frac{2\pi}{5}\right) \end{bmatrix} \times \begin{bmatrix} V_{\alpha^*} \\ V_{\beta^*} \end{bmatrix}, \quad (5)$$

where Table 2 of FIG. 6 indicates which phase has faulted via setting phase coefficient ($k_i$) for that phase equal to zero (0).

It is noted that the equation (5) applies to the specific example when phase D is not faulting along with any two of the other phases. Similar equations can be produced for the other phases A, B, C, E when that phase is not faulting along with any two of the other phases. For sake of brevity, examples of these equations will not be described. In general, the equation (5) can be modified so that it applies to other specific examples when phase A, B, C or E are always healthy (i.e., not faulting/failing) along with any two of the other phases by rotating the transformation matrix by plus/minus seventy-two degrees (72°) or by plus/minus one-hundred forty-four degrees (144°). For example, if phase E is always healthy (i.e., not faulting/failing) along with any two of the other phases, the transformation matrix is rotated by seventy-two degrees (72°) because there are 72 degrees between phases D and E. Similarly, if phase C is always healthy (i.e., not faulting/failing) along with any two of the other phases, the transformation matrix is rotated by negative seventy-two degrees (−72°) because there are 72 degrees between phases C and D. By contrast, if phase A is always healthy (i.e., not faulting/failing) along with any two of the other phases, the transformation matrix is rotated by one-hundred forty-four degrees (144°) because there are 144 degrees between phases A and D. Likewise, if phase B is always healthy (i.e., not faulting/failing) along with any two of the other phases, the transformation matrix is rotated by negative one-hundred forty-four degrees (−144°) because there are 144 degrees between phases B and D.

Consider an example where the fault detection module 214 detects a phase fault or phase failure based on the measured five-phase stationary reference frame current signal (Ia) 122 and the measured five-phase stationary reference frame current signal (Ib) 123. Here, the fault detection module 214 generates a fault signal 220 and sends it to the αβ-to-five phase transformation module 106 to indicate that a fault/failure condition has been detected with respect to phase A and phase B. The fault signal 220 includes information that indicates that phases A and B are presently experiencing a fault condition or failure. In response to the fault signal 220, the two-to-five phase transformation module 106 identifies/selects equation (5) above and modifies it to generate equation (5A) below.

$$\begin{bmatrix} V_{as^*} \\ V_{bs^*} \\ V_{cs^*} \\ V_{ds^*} \\ V_{es^*} \end{bmatrix} = \begin{bmatrix} 0 & 0 \\ 0 & 0 \\ \sqrt{5}\cos\left(\frac{2\pi}{5}\right) & -\sqrt{5}\sin\left(\frac{2\pi}{5}\right) \\ \frac{5+\sqrt{5}}{2}\cos\left(\frac{4\pi}{5}\right) & \frac{5+\sqrt{5}}{2}\sin\left(\frac{4\pi}{5}\right) \\ \sqrt{5} & 0 \end{bmatrix} \times \begin{bmatrix} V_{\alpha^*} \\ V_{\beta^*} \end{bmatrix} \quad (5A)$$

In equation (5A), the first and second rows of the transformation matrix have zero values such that phase A and phase B are not considered when converting the two-phase stationary reference frame voltage command signals (Vα*, Vβ*) 104-1, 105-1 to non-faulting five-phase stationary reference frame voltage command signals (Vcs* . . . Ves*) 107. Using equation (5A) to compute non-faulting five-phase stationary reference frame voltage command signals (Vcs* . . . Ves*) 107 when both phases A and B have faulted/failed can provide better provide current regulation in the synchronous frame. Thus, the αβ-to-five phase transformation module 106 can select the appropriate equation and modify it such that only the "healthy" or non-faulting phases are transformed to five-phase stationary reference frame voltage command signals (Vas* . . . Ves*) 107.

Although equation (5A) above assumes that phases C, D, E are healthy, and that phases A and B are in a fault condition, it will be appreciated that similar equations (not shown) can be used at the αβ-to-five phase transformation module 106 to compute non-faulting five-phase stationary reference frame voltage command signals (Vas* . . . Ves*) 107 when any combination of two-phases are experiencing a fault condition. For sake of brevity these are not shown. In all such cases, however, two columns of the transformation matrix that correspond to the faulting phases will include zero values such that the particular faulting phases are not considered when converting the two-phase stationary reference frame voltage command signals (Vα*, Vβ*) 104-1, 105-1 to non-faulting five-phase stationary reference frame voltage command signals (Vas* . . . Ves*) 107.

Thus, the disclosed embodiments can provide for fault tolerant synchronous current regulation of a five-phase machine when one (or more) of its phase(s) is faulted. By regulating current in the synchronous reference frame, more accurate current regulation can be achieved. For example, in contrast to current regulation in the stationary phase, the disclosed synchronous frame current regulation techniques do not suffer from phase lag, and therefore, may have faster transient response. In this regard, current regulation may be more robust. In addition, the control tables that convert torque command to current commands (block 140 in FIG. 1) do not need to be changed for every phase failure case. The disclosed embodiments may also help to maintain optimum torque and power control when the motor operates at high speeds in field-weakening region. In the context of a HEV application, if one of the phases of a five-phase system fails, then the system can still operate on a lower power rating during the phase fault, and the disclosed techniques allow for current regulation to be maintained to provide torque and power and allow the vehicle operator to continue driving, and, for example, to reach their destination or get to a shop for fault diagnostic.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for synchronously regulating current in a vector controlled motor drive system that includes a five-phase AC machine having five phases and a five-phase inverter module that generates five-phase stationary reference frame stator currents for the five-phase AC machine, the method comprising:

performing a five phase-to-$\alpha\beta$ phase transformation, based on particular phases indicated in a fault signal as being faulting phases, which transforms particular ones of the five-phase stationary reference frame stator currents that correspond to non-faulting phases to $\alpha\beta$-phase stationary reference frame stator currents, and wherein particular ones of the five-phase stationary reference frame stator currents that correspond to faulting phases that are experiencing fault condition(s) are excluded from the five phase-to-$\alpha\beta$ phase transformation;

generating synchronous reference frame feedback current signals, based on the $\alpha\beta$-phase stationary reference frame feedback stator currents, and a rotor angular position; and generating synchronous reference frame voltage command signals, based on the synchronous reference frame feedback current signals, and synchronous reference frame current commands.

2. A method according to claim 1, further comprising:

determining whether a phase fault condition exists with respect to one or more of the five phases based on measured five-phase stationary reference frame stator currents;

generating, when one or more phase(s) is determined to be experiencing a fault condition, a fault signal comprising information that indicates which particular phases are presently experiencing fault condition(s);

wherein the step of performing a five phase-to-$\alpha\beta$ phase transformation, comprises the steps of:

selecting, based on the particular phases indicated in the fault signal, one of a plurality of five phase-to-$\alpha\beta$ phase transformation equations that corresponds to a particular combination of non-faulting phases;

modifying the selected five phase-to-$\alpha\beta$ phase transformation equation, based on the particular phases indicated in the fault signal that correspond to the non-faulting phases, to generate a modified five phase-to-αβ phase transformation equation; and transforming, based on the modified five phase-to-αβ phase transformation equation, particular ones of the five-phase stationary reference frame stator currents that correspond to non-faulting phases to generate two-phase stationary reference frame stator currents.

3. A method according to claim 2, wherein the plurality of five phase-to-αβ phase transformation equations comprise: a first five phase-to-αβ phase transformation equation which is capable of being used to transform four non-faulting ones of the five-phase stationary reference frame stator currents that correspond to four non-faulting phases; and a second five phase-to-αβ phase transformation equation which is capable of being used to transform three non-faulting ones of the five-phase stationary reference frame stator currents that correspond to three non-faulting phases.

4. A method according to claim 1, further comprising:
generating αβ-phase stationary reference frame voltage command signals, based on the synchronous reference frame voltage command signals, and angular rotor position; and
performing a αβ phase-to-five phase transformation, based on the particular phases indicated in the fault signal, that transforms the αβ-phase stationary reference frame voltage command signals, to generate either three or four five-phase stationary reference frame voltage command signals that correspond to the particular non-faulting phases.

5. A method according to claim 4, wherein the step of performing a αβ phase-to-five phase transformation comprises the steps of:
selecting, based on the particular phases indicated in the fault signal, one of a plurality of αβ phase-to-five phase transformation equations;
modifying the selected αβ phase-to-five phase transformation equation, based on the particular phases indicated in the fault signal that correspond to the non-faulting phases, to generate a modified αβ phase-to-five phase transformation equation; and
transforming, based on the modified αβ phase-to-five phase transformation equation, the αβ-phase stationary reference frame voltage command signals, to generate either three or four five-phase stationary reference frame voltage command signals that correspond to the particular non-faulting phases.

6. A method according to claim 5, wherein the plurality of αβ phase-to-five phase transformation equations comprises:
a first αβ phase-to-five phase transformation equation which is capable of being used to transform the αβ-phase stationary reference frame voltage command signals, into four five-phase stationary reference frame voltage command signals that correspond to four particular non-faulting phases; and
a second αβ phase-to-five phase transformation equation which is capable of being used to transform the αβ-phase stationary reference frame voltage command signals, into three five-phase stationary reference frame voltage command signals that correspond to three particular non-faulting phases.

7. A system, comprising:
a five-phase AC machine having five phases;
a five-phase inverter module, coupled to the five-phase AC machine, and being designed to generate five-phase stationary reference frame stator currents;

a five-to-αβ phase transformation module designed to perform a five phase-to-αβ phase transformation, based on particular phases indicated in a fault signal as being faulting phases, wherein the five phase-to-αβ phase transformation transforms particular ones of the five-phase stationary reference frame stator currents that correspond to non-faulting phases to αβ-phase stationary reference frame stator currents, and wherein particular ones of the five-phase stationary reference frame stator currents that correspond to faulting phases that are experiencing fault condition(s) are excluded from the five phase-to-αβ phase transformation;
a stationary-to-synchronous transformation module designed to receive the αβ-phase stationary reference frame feedback stator currents, and a rotor angular position and to generate synchronous reference frame feedback current signals; and
a synchronous current regulator designed to: generate synchronous reference frame voltage command signals, based on the synchronous reference frame feedback current signals, and synchronous reference frame current commands.

8. A system according to claim 7, further comprising:
a fault detection module designed to: determine whether a phase fault condition exists with respect to one or more of the five phases; and generate a fault signal when a phase fault condition is determined to exist with respect to one or more of the five phases, wherein the fault signal comprises information that indicates which particular phases are presently experiencing the fault condition, and
wherein the five-to-αβ phase transformation module is designed to:
select, based on the particular phases that are identified as presently experiencing a fault condition in the fault signal, one of a plurality of five phase-to-two phase transformation equations that is to be used to transform particular non-faulting ones of the five-phase stationary reference frame stator currents that are feedback from the five-phase AC machine and correspond to non-faulting phases that are not presently experiencing a fault condition;
modify the selected five phase-to-αβ phase transformation equation, based on the particular phases indicated in the fault signal that correspond to the non-faulting phases, to generate a modified five phase-to-αβ phase transformation equation; and
transform, based on the modified five phase-to-αβ phase transformation equation, the particular ones of the five-phase stationary reference frame stator currents that correspond to non-faulting phases to generate αβ-phase stationary reference frame stator currents.

9. A system according to claim 8, wherein the plurality of five phase-to-αβ phase transformation equations comprise:
a first five phase-to-αβ phase transformation equation which is capable of being used to transform four non-faulting ones of the five-phase stationary reference frame stator currents that correspond to four non-faulting phases; and
a second five phase-to-αβ phase transformation equation which is capable of being used to transform three non-faulting ones of the five-phase stationary reference frame stator currents that correspond to three non-faulting phases.

10. A system according to claim 9, further comprising:
a synchronous-to-stationary transformation module designed to generate αβ-phase stationary reference frame voltage command signals, based on the synchronous reference frame voltage command signals;

a αβ-to-five phase transformation module designed to:

receive the fault signal and the αβ-phase stationary reference frame voltage command signals, select, based on the particular phases that are identified as presently experiencing a fault condition in the fault signal, one of a plurality of αβ phase-to-five phase transformation equations; modifying the selected αβ phase-to-five phase transformation equation, based on the particular phases indicated in the fault signal that correspond to the non-faulting phases, to generate a modified αβ phase-to-five phase transformation equation; and transform the αβ-phase stationary reference frame voltage command signals, based on the modified αβ phase-to-five phase transformation equation, to generate either three or four five-phase stationary reference frame voltage command signals that correspond to the particular non-faulting phases.

11. A system according to claim 10, wherein the plurality of αβ phase-to-five phase transformation equations comprise:

a first αβ phase-to-five phase transformation equation which is capable of being used to transform the αβ-phase stationary reference frame voltage command signals, into four five-phase stationary reference frame voltage command signals that correspond to four particular non-faulting phases; and a second αβ phase-to-five phase transformation equation which is capable of being used to transform the two-phase stationary reference frame voltage command signals, into three five-phase stationary reference frame voltage command signals that correspond to three particular non-faulting phases.

12. A vector controlled motor drive system, comprising:

a five-phase AC machine having five phases;

a five-phase inverter module, coupled to the five-phase AC machine, and designed to generate five-phase stationary reference frame stator currents;

a current measurement module designed to measure the five-phase stationary reference frame stator currents that are feedback from the five-phase AC machine;

a fault detection module designed to: determine whether a phase fault condition exists with respect to one or more of the five phases based on the measured five-phase stationary reference frame stator currents; generate a fault signal when a phase fault condition is determined to exist with respect to one or more of the five phases, wherein the fault signal indicates that a fault condition has been detected with respect to one or more phase(s) and includes information that indicates which particular phases are presently experiencing the fault condition; and a five-to-αβ phase transformation module designed to:

receive the fault signal and the five-phase stationary reference frame stator currents that are feedback from the five-phase AC machine, select, based on the particular phases that are identified as presently experiencing a fault condition in the fault signal, one of a plurality of five phase-to-αβ phase transformation equations that is to be used to transform particular ones of the five-phase stationary reference frame stator currents that correspond to non-faulting phases, modify the selected five phase-to-αβ phase transformation equation, based on the particular phases indicated in the fault signal that correspond to the non-faulting phases, to generate a modified five phase-to-αβ phase transformation equation; and transform, based on the modified five phase-to-αβ phase transformation equation, the particular ones of the five-phase stationary reference frame stator currents that correspond to generate non-faulting phases to αβ-phase stationary reference frame stator currents;

a stationary-to-synchronous transformation module designed to receive the αβ-phase stationary reference frame feedback stator currents and a rotor angular position, and to generate a synchronous reference frame d-axis current signal and a synchronous reference frame q-axis current signal; and a synchronous current regulator designed to regulate current in a synchronous reference frame, wherein the synchronous current regulator is designed to: generate a synchronous reference frame d-axis voltage command signal and a synchronous reference frame q-axis voltage command signal based on the synchronous reference frame d-axis feedback current signal, the synchronous reference frame q-axis feedback current signal, a d-axis current command and a q-axis current command.

13. A vector controlled motor drive system according to claim 12, wherein the plurality of five phase-to-αβ phase transformation equations comprise:

a first five phase-to-αβ phase transformation equation which is capable of being used to transform four non-faulting ones of the five-phase stationary reference frame stator currents that correspond to four non-faulting phases, wherein the first five phase-to-αβ phase transformation equation comprises:

$$\begin{bmatrix} I_\alpha \\ I_\beta \end{bmatrix} = \frac{2}{5} \begin{bmatrix} \delta_a\cos(0) & \delta_b\cos\left(\frac{-2\pi}{5}\right) & \delta_c\cos\left(\frac{-4\pi}{5}\right) & \delta_d\cos\left(\frac{4\pi}{5}\right) & \delta_e\cos\left(\frac{2\pi}{5}\right) \\ \delta_a\sin(0) & \delta_b\sin\left(\frac{-2\pi}{5}\right) & \delta_c\sin\left(\frac{-4\pi}{5}\right) & \delta_d\sin\left(\frac{4\pi}{5}\right) & \delta_e\sin\left(\frac{2\pi}{5}\right) \end{bmatrix} \times \begin{bmatrix} I_a \\ I_b \\ I_c \\ I_d \\ I_e \end{bmatrix}$$

$$\delta_i = \begin{cases} 0, & \text{faulted phase} \\ 1, & \text{healthy phase} \end{cases}, \text{ where } i \text{ is } a, b, c, d, \text{ or } e,$$

wherein a phase coefficient ($\delta_i$) is set equal to zero (0) for the faulting phase and set to one (1) for the four non-faulting phases.

14. A vector controlled motor drive system according to claim 13, wherein the plurality of five phase-to-αβ phase transformation equations further comprise:

a second five phase-to-αβ phase transformation equation which is capable of being used to transform three non-faulting ones of the five-phase stationary reference frame stator currents that correspond to three non-faulting phases, wherein the second five phase-to-αβ phase transformation equation comprises:

$$\begin{bmatrix} I_\alpha \\ I_\beta \end{bmatrix} =$$

$$\frac{2}{5} \begin{bmatrix} \delta_a\cos(0) & \delta_b\cos\left(\frac{-2\pi}{5}\right) & \delta_c\cos\left(\frac{-4\pi}{5}\right) & \delta_d\cos\left(\frac{4\pi}{5}\right) & \delta_e\cos\left(\frac{2\pi}{5}\right) \\ \delta_a\sin(0) & \delta_b\sin\left(\frac{-2\pi}{5}\right) & \delta_c\sin\left(\frac{-4\pi}{5}\right) & \delta_d\sin\left(\frac{4\pi}{5}\right) & \delta_e\sin\left(\frac{2\pi}{5}\right) \end{bmatrix} \times \begin{bmatrix} I_a \\ I_b \\ I_c \\ I_d \\ I_e \end{bmatrix},$$

$$\delta_i = \begin{cases} 0, & \text{faulted phase} \\ 1, & \text{healthy phase} \end{cases}, \text{ where } i \text{ is } a, b, c, d, \text{ or } e$$

wherein a phase coefficient ($\delta_i$) is set equal to zero (0) for the two faulting phases and is set to one (1) for the three non-faulting phases.

15. A vector controlled motor drive system according to claim 12, further comprising:
   a synchronous-to-stationary transformation module designed to generate an α-axis stationary reference frame voltage command signal and a β-axis stationary reference frame voltage command signal based on the synchronous reference frame d-axis voltage command signal, the synchronous reference frame q-axis voltage command signal; and
   a αβ-to-five phase transformation module designed to:
   receive the fault signal, the α-axis stationary reference frame voltage command signal, and the β-axis stationary reference frame voltage command signal,
   select, based on the particular phases that are identified as presently experiencing a fault condition in the fault signal, one of a plurality of αβ phase-to-five phase transformation equations that is to be used to transform the α-axis stationary reference frame voltage command signal and the β-axis stationary reference frame voltage command signal;
   modify the selected αβ phase-to-five phase transformation equation, based on the particular phases indicated in the fault signal that correspond to the non-faulting phases, to generate a modified αβ phase-to-five phase transformation equation; and
   transform the α-axis stationary reference frame voltage command signal and the β-axis stationary reference frame voltage command signal, based on the modified αβ phase-to-five phase transformation equation, to generate either three or four five-phase stationary reference frame voltage command signals that correspond to the particular non-faulting phases.

16. A vector controlled motor drive system according to claim 15, wherein the plurality of αβ phase-to-five phase transformation equations comprise:
   a first αβ phase-to-five phase transformation equation which is capable of being used to transform the α-axis stationary reference frame voltage command signal and the β-axis stationary reference frame voltage command signal into four five-phase stationary reference frame voltage command signals that correspond to four particular non-faulting phases, wherein the second five phase-to-αβ phase transformation equation comprises:

$$\begin{bmatrix} V_{as^*} \\ V_{bs^*} \\ V_{cs^*} \\ V_{ds^*} \\ V_{es^*} \end{bmatrix} = \frac{5-\sqrt{5}}{2} \begin{bmatrix} \delta_a\cos(\Delta\varphi_a) & \delta_a\sin(\Delta\varphi_a) \\ \delta_b\cos\left(\Delta\varphi_b - \frac{2\pi}{5}\right) & \delta_b\sin\left(\Delta\varphi_b - \frac{2\pi}{5}\right) \\ \delta_c\cos\left(\Delta\varphi_c - \frac{4\pi}{5}\right) & \delta_c\sin\left(\Delta\varphi_c - \frac{4\pi}{5}\right) \\ \delta_d\cos\left(\Delta\varphi_d + \frac{4\pi}{5}\right) & \delta_d\sin\left(\Delta\varphi_d + \frac{4\pi}{5}\right) \\ \delta_e\cos\left(\Delta\varphi_e + \frac{2\pi}{5}\right) & \delta_e\sin\left(\Delta\varphi_e + \frac{2\pi}{5}\right) \end{bmatrix} \times \begin{bmatrix} V_{\alpha^*} \\ V_{\beta^*} \end{bmatrix},$$

wherein a phase coefficient ($\delta_i$) is set equal to zero (0) for the faulting phase and is set to one (1) for the non-faulting phase, wherein $V_\alpha$ is the α-axis stationary reference frame voltage command signal and $V_\beta$ is the β-axis stationary reference frame voltage command signal.

17. A vector controlled motor drive system according to claim 16, wherein the plurality of αβ phase-to-five phase transformation equations further comprise:
   a second αβ phase-to-five phase transformation equation which is capable of being used to transform the α-axis stationary reference frame voltage command signal and the β-axis stationary reference frame voltage command signal into three five-phase stationary reference frame voltage command signals that correspond to three particular non-faulting phases, wherein the second αβ phase-to-five phase transformation equation comprises:

$$\begin{bmatrix} V_{as^*} \\ V_{bs^*} \\ V_{cs^*} \\ V_{ds^*} \\ V_{es^*} \end{bmatrix} = \begin{bmatrix} k_a\cos(\Delta\varphi_a) & k_a\sin(\Delta\varphi_a) \\ k_b\cos\left(\Delta\varphi_b - \frac{2\pi}{5}\right) & k_b\sin\left(\Delta\varphi_b - \frac{2\pi}{5}\right) \\ k_c\cos\left(\Delta\varphi_c - \frac{4\pi}{5}\right) & k_c\sin\left(\Delta\varphi_c - \frac{4\pi}{5}\right) \\ k_d\cos\left(\Delta\varphi_d + \frac{4\pi}{5}\right) & k_d\sin\left(\Delta\varphi_d + \frac{4\pi}{5}\right) \\ k_e\cos\left(\Delta\varphi_e + \frac{2\pi}{5}\right) & k_e\sin\left(\Delta\varphi_e + \frac{2\pi}{5}\right) \end{bmatrix} \times \begin{bmatrix} V_{\alpha^*} \\ V_{\beta^*} \end{bmatrix},$$

wherein a phase coefficient ($k_i$) is set equal to zero (0) for the faulting phase and set to one (1) for the non-faulting phase, wherein $V_\alpha$ is the α-axis stationary reference frame voltage command signal and $V_\beta$ is the β-axis stationary reference frame voltage command signal.

18. A vector controlled motor drive system according to claim 15, further comprising:
   a space vector pulse width modulation (SVPWM) module designed to generate switching vector signals based on the either three or four five-phase stationary reference frame voltage command signals that are received from the αβ-to-five phase transformation module.

* * * * *